(No Model.) 2 Sheets—Sheet 2.

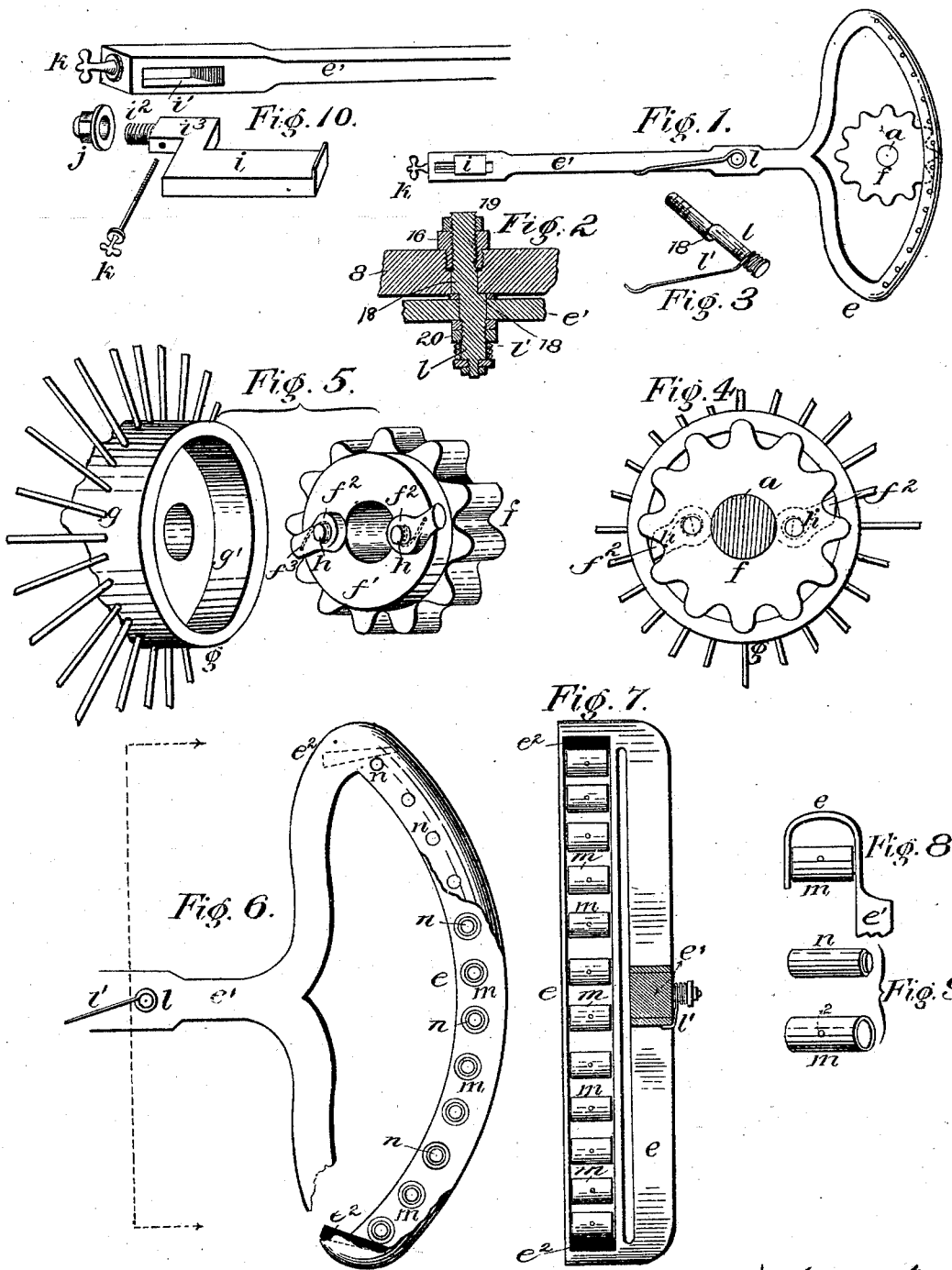

L. SHAPIRO.
BICYCLE.

No. 509,692. Patented Nov. 28, 1893.

UNITED STATES PATENT OFFICE.

LAZARUS SHAPIRO, OF SAN JOSÉ, CALIFORNIA.

BICYCLE.

SPECIFICATION forming part of Letters Patent No. 509,692, dated November 28, 1893.

Application filed November 16, 1891. Serial No. 412,057. (No model.)

*To all whom it may concern:*

Be it known that I, LAZARUS SHAPIRO, a citizen of the United States, residing at San José, in the county of Santa Clara and State of California, have invented a new and useful Improvement in Bicyles, of which the following is a specification.

My invention is directed to improvements in the propelling mechanism of bicycle driving wheels, and the several features of my improvements will be separately and specifically pointed out in the claims concluding this specification. The driving gear is of the lever-treadle type and the improved construction relates to the driving or foot lever segment and its gear connection, whereby the friction of the gear is greatly reduced and the segment rendered more durable. The bicycle may have any suitable construction of frame and the steering and drive-wheels may be such as are used in safety bicycles, in which the treadle-levers are pivoted on the frame bars 8 and engage gear wheels on the axle $a$ at each side of the drive-wheel.

Figure 12:
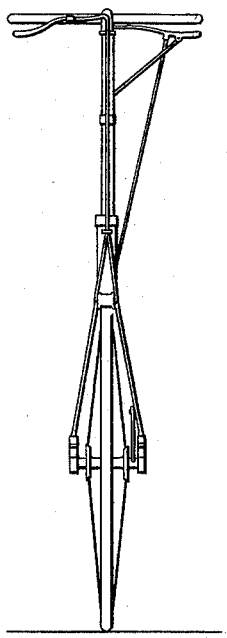
Figure 11:
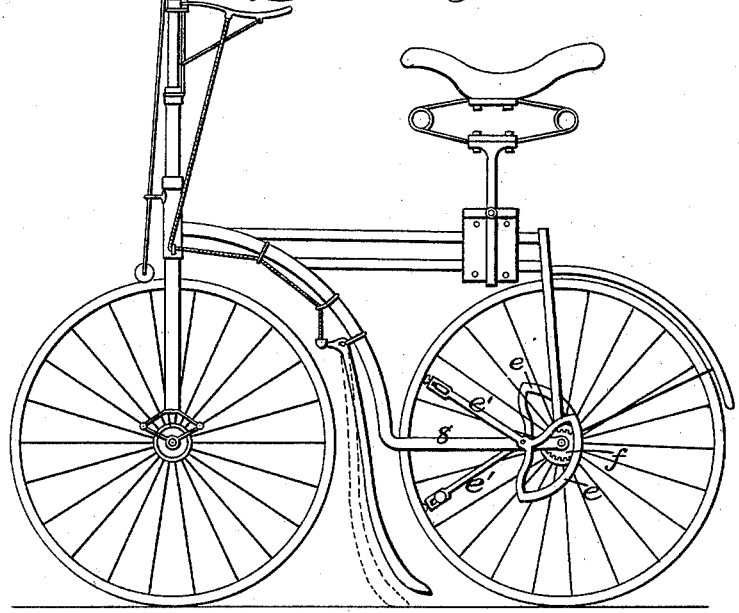

Referring to the drawings: Figure 1 shows the treadle-lever and its segmental propelling rack. Fig. 2 is a sectional detail of the eccentric bearing-pin of said lever. Fig. 3 shows the eccentric bearing-pin and its connected spring for the treadle-lever. Fig. 4 shows a face view of the driving gear and its clutch relation to the recessed-hub of the propelling wheel. Fig. 5 shows the driving clutch device and the recessed hub of the propelling wheel. Fig. 6 shows the segmental rack of rolling cogs of the treadle lever. Fig. 7 shows the treadle-lever segmental rack of rolling cogs looking in the direction of the dotted line Fig. 6. Fig. 8 shows the rolling rack cogs in end view; and Fig. 9 the fixed stud and the rolling sleeve therefor; and Fig. 10 shows the details of the treadle lever foot-rest and its clamping and adjusting screws. Fig. 11 is a side view of the bicycle; and Fig. 12 is a front view of the same.

The hub $g$ of the drive-wheel has an annular recess $g'$ at each end, the walls of which are unbroken, and covering these recesses at each end of the hub are the cog wheels $f$ which are fitted loosely on each end of the axle. The teeth of these cog wheels are formed rounding at their ends and at the base, and each gear has a face disk $f'$, see Fig. 5, which stands within but does not fill the hub recess. On the face of the disk are two studs $h$ $h$ diametrically arranged on which are pivotally secured a dog $f^2$ so that its beveled gripping or biting end will project beyond the circumference of the said face disk for action upon the inner smooth wall $g'$ of the hub in the manner of a clutch for engaging the loose gear wheels with the drive-wheel, which is fixed on said shaft for driving said wheel. Each dog or clutch $f^2$ is held in position by a spring $f^3$, seen in dotted lines in Figs. 4 and 5, so that the dogs act by pressure against the walls of the hub and not by ratchet action. This clutch action by pressure is effected by maintaining the dogs in diagonal relation to the disks by the spring $f^3$ the tension of which is merely sufficient to hold the dogs in their proper positions so that the turning of the cog wheel $f$ will turn its face pins $h$ with a crank action and in so doing tend to move the dogs in radial positions, which forces them out and brings their beveled ends hard against the inner walls $g'$ of the hub and in this way the propelling wheel is driven without any lost motion, the pins $h$ and the dogs $f^2$ giving a firm and durable connection between the loose cog-wheels $f$ and the propelling wheel.

The axle $a$ of the drive-wheel is mounted on the arms 8 of the backbone and on the outer side of each of these arms is pivotally mounted a treadle rack-lever $e'$ which has a segmental rack $e$ adapted to engage the gear wheel $f$ and to act in driving them in a well known way. Referring to Figs. 6, 7 and 8 it will be seen that these segments are trough-shaped in cross section, the open side being inward next to the gear. In transverse parallel relation at suitable distances apart studs $n$ are fixed in the trough sides near the edges and on these studs I place loose sleeves $m$ each having a hole 2 for oil. These rolling sleeves $m$ form the segmental rack and engage with the curved cogs of the gear wheel. The advantage of the rolling function of this treadle-rack is the reduction of friction as compared with a rack of cogs as heretofore used for such propelling gear. The rolling rack cogs give an easier motion for the treadle action and they are more durable than the cast cogs.

This trough of rolling cogs stands inward from the inner side of the treadle-lever, as seen in Figs. 7 and 8, a sufficient distance to permit the rack of rolling cogs to engage the gear wheel which is on the inner side of the bearing arm of the backbone as seen in Fig. 11. I prefer to form the trough and the treadle-lever in one piece to render it strong and the holes for the studs are drilled in each side of the trough and the studs $n$ are riveted at each end after the rolling sleeves $m$ are placed upon them. The rolling sleeves I prefer to make of steel; and the riveting of the studs adds strength to the trough which is an important consideration in the lever-rack. The length of the cog segment will be greater than the full stroke of the treadle-lever, and I may provide rubber stops $e^2$, Fig. 7, at each end of the rack to cushion the thrust should the stroke of the lever bring its end in contact with the pinion. A spring $l'$ attached to the pivot pin $l$ of the treadle-lever $e'$ bears upon the latter and serves to return it, after being pressed down to its opposite position. In this upward movement of the treadle-lever, the gear wheel dogs are released from the wheel-hub and the gear rotates loosely on its shaft as the segment moves down. The treadle-lever has an adjustable foot-rest plate $i$, one end of which is fitted in a slot $i'$ and has a screw-stem $i^2$ to receive a nut $j$ by which it is clamped in the slot $i'$, while a thumb screw $k$ passes into a hole in the end of the lever and screws into the end of the foot-rest $i$ to slide it in or out to suit the rider's limbs and to lengthen or shorten the leverage as required. For this purpose the foot-plate has an L-shaped end bend $i^3$ which fits in the lever slot, so that the nut $j$ will clamp the end of the foot-plate against the side of the lever with the foot-plate standing out at right angles thereto. It is this angle bend in the foot-plate that fits in the slot, that the screw stem $k$ engages to set the foot-rest as stated.

I provide an eccentrically adjustable pivot bearing $l$ for the treadle-lever as a means for compensating for lost motion from the wear of the propelling device as seen in Figs. 2 and 3. The pivot-bearing for this purpose is made of two parts having a solid eccentric joining at their meeting ends, so as to form a single pin with two eccentric shoulders 18 at such joining. Each end of the pin is screw threaded and it is fitted into the bar 8 of the frame and secured by lock nuts 19 and 20, so that the eccentric outer part will stand rearward and form the fulcrum-pivot for the treadle-lever. As therefore the propelling gear wears, the lost motion produced thereby can be taken up, by turning the pivot-pin $l$ so as to bring its outer eccentric bearing part forward toward the front and thereby bring the rolling cogs of the segment closer with the cogs of the gear wheel. In this adjustment it is important to notice that the treadle lever is moved without changing the position thereof relative to the fulcrum pin; and that the adjustment can be made from time to time by turning the fulcrum pin in the way described. As shown in Fig. 2 the eccentric-pin is secured in the rear bar 8 of the frame by lock-nuts 19 and 20, which serve also to clamp the eccentric shoulder 18 of the pin against the outer side of the frame-bar. To turn the pin it is unclamped and when turned to the left the eccentric action draws the lever toward the front so that its rack $e$ will be maintained in close working relation to the gear of the driving wheel.

In Fig. 2 I have shown the inner end of the hole in the bar 8 as being of larger diameter and screw threaded and into this enlarged part of the hole is fitted a nut 16 which is also screwed upon the inner end of the pivot-pin so as to clamp the shoulder 18 of the pin firmly to the outer side of the bar, while the nut 19 locks the nut 16 and holds the bearing-pin at the point at which the eccentric is set to adjust the lever-rack to the driving-gear. But this double threaded nut may be dispensed with.

It will be understood that the treadle-levers act as drivers for two clutch gear wheels and for this purpose a treadle lever is pivoted on a bar of the frame at each side of the driving wheel. The arrangement of the trough racks on the rear ends of the levers gives the advantage of operating them on the rear sides of the cog wheels as seen in Fig. 1, and by placing the fulcrum of the lever near the segment, say about six inches from it, greatly increases the leverage and the propelling power proportionately. This arrangement with levers fifteen inches long, the cog wheels three inches in diameter, and the cog segments nine inches long, will render effective the full stroke of the lever and cause the cog wheel to make more than a full turn at every stroke of the lever.

I claim as my improvement—

1. In a bicycle, the propelling device comprising the gear-wheel $f$ having rounded cogs, the pivoted dogs $f^2$ for engaging the hub of the propelling wheel and the treadle-lever $e'$ having a segmental trough $e$ standing out at one side of said lever provided with fixed studs $n$ and sleeves $m$ fitted on said studs between and in the walls of said trough for engaging said gear, as described.

2. In a bicycle, the combination, with the propelling levers mounted on the frame, each lever terminating in a trough standing out at its side and having a rack of rolling cogs $m$ mounted in the walls of said trough and the gear wheel $f$ engaging said trough of rolling cogs, of a fulcrum pin $l$ for said lever formed with an eccentric bearing 18 in the frame and having clamp nuts at each end for securing and adjusting the treadle-lever, as described.

3. In a bicycle, the propelling treadle levers $e'$ having each a segmental trough $e$ at its end standing out at the side, provided with studs $n$ fixed transversely in the walls of said trough and having rolling sleeves $m$, in combination with the gear wheel $f$ having dogs $f^2$ for engaging the drive wheel hub, and the treadle connected springs $l'$, as described.

4. In a bicycle propelling gear, the treadle-lever having a slot $i'$ at its end combined with a foot-rest plate $i$ having a crank shaped tenon $i^3$ fitting said slot, a clamp screw $j$ engaging said tenon, and a thumb-screw $k$ passing through the end of said lever and engaging said tenon, whereby to set the foot-rest plate as described.

In testimony whereof I have signed this specification in the presence of two subscribing witnesses.

LAZARUS SHAPIRO.

Witnesses:
W. F. WRIGHT,
W. W. LIPSETT.